Patented Aug. 29, 1944

2,357,095

UNITED STATES PATENT OFFICE 2,357,095

PROCESS FOR THE MANUFACTURE OF ANHYDROUS HYDROGEN HALIDE

Theodore W. Evans, Oakland, and Harry de V. Finch, Berkeley, Calif., assignors to Shell Development Company, San Francisco, Calif., a corporation of Delaware No Drawing. Application October 4, 1941, Serial No. 413,690

3 Claims. (Cl. 23—154)

The present invention relates to a method for the recovery of a substantially anhydrous hydrogen halide from an aqueous solution thereof, which method comprises subjecting the aqueous solution of a hydrogen halide to extractive distillation employing as the auxiliary solvent an aqueous solution of a hygroscopic salt which has a vapor pressure of water not greater than about 8 mm. of mercury at about 20° C. A particular embodiment of the invention is the production of substantially anhydrous hydrogen chloride by extractive distillation of an aqueous solution of hydrochloric acid employing a concentrated aqueous solution of calcium chloride as the auxiliary solvent.

"A substantially anhydrous hydrogen halide," as the term is used herein and in the appended claims means a gaseous hydrogen halide which contains less than about 1% by weight of water. The hydrogen halides which may be recovered from their aqueous solutions in accordance with the process are hydrogen chloride, hydrogen bromide, hydrogen iodide and in some cases hydrogen fluoride. Hydrogen halide solutions of a wide variety of concentrations may be treated successfully in accordance with the process of the invention; however, the process is particularly adapted to the recovery of a substantially anhydrous hydrogen halide from relatively dilute aqueous hydrogen halide solutions, for example solutions having a hydrogen halide concentration of from about 10% to about 40%. It is, however, to be understood that aqueous solutions of hydrogen halides of lower as well as higher concentrations may be treated successfully in accordance with the process.

It has been only comparatively recently that extractive distillation has been used commercially. Because of its effectiveness and economy, as well as its ability to effect the separation of azeotropic mixtures, extractive distillation is in many cases, and particularly for the separation of hydrogen halides from their aqueous solutions, superior to other known methods of separation such as fractional distillation, azeotropic distillation, solvent extraction, crystallization, etc. Extractive distillation may be defined as a process for at least partially separating two miscible components by fractional distillation in the presence of an auxiliary solvent which solvent has a higher boiling temperature than either miscible component and also has a preferential solubility for one of said components.

In the usual execution of a continuous extractive distillation process, the auxiliary solvent is caused to flow down an extraction-fractionation column as the operation proceeds and vapors of at least one of the separable components ascend from the kettle or reboiler. Thus the solvent scrubs the vapors in a first or presaturator zone, selectively dissolving the more soluble component or components, and the resulting solution is partially stripped in a second or extraction zone by vapors ascending from the distillation kettle having a higher temperature than said first zone. The dissolved components are then removed from the solution by suitable means and the solvent regenerated and made suitable for reuse in the process.

The auxiliary solvent in an extractive distillation process in effect decreases the vapor pressure of one of the components to be extracted more than that of the other components. Therefore, it is important to employ an auxiliary solvent having as many desirable solubility and vapor pressure characteristics as possible. For example, in the specific case of the recovery of hydrogen chloride gas from a dilute aqueous solution thereof, the ideal auxiliary solvent would possess, among others, the following characteristics: (1) a high vapor pressure of hydrogen chloride and a low vapor pressure of water at operating temperatures; (2) no tendency to separate a solid phase when saturated with hydrogen chloride; (3) low heat of vaporization in hydrogen chloride; and (4) controllable corrosion in usual materials of construction or apparatus. These properties might also be said to include stability, ease of regeneration, no substantial solubility for hydrogen chloride, and a vapor pressure of water of less than 7.6 mm. of mercury at about room temperature. It is also important that the solvent be used in as concentrated a solution as possible, but not so concentrated that it will crystallize out of solution and clog the apparatus at temperatures as low as 20° C.

It has been found that for the recovery of substantially anhydrous hydrogen halides, particularly hydrogen chloride, from aqueous solutions thereof by extractive distillation, the auxiliary solvents which are particularly suitable in that they meet the greater number of these qualifications are aqueous solutions, preferably fairly concentrated solutions, of hygroscopic salts, for example calcium chloride, zinc chloride, magnesium chloride, calcium bromide, calcium iodide, ferric chloride, and the like. The aqueous salt solutions which we prefer to use have a concentration in the range of from about 10% to about 60% by weight, depending on the solubility of the salt employed and on the vapor pressure of the particular salt solution. Calcium chloride solutions having a concentration of from 30% to 60% have been found to be particularly suitable.

The International Critical Tables show that concentrated solutions of some of the above-mentioned preferred auxiliary solvents have the following desirable properties:

| Solvent | Solvent in H₂O | Vapor pressure of H₂O mm. of Hg | Temperature |
|---|---|---|---|
| | Percent | Mm. | °C. |
| Calcium chloride | 41 | 6 | 20 |
| Do | 47 | 7.3 | 28.5 |
| Ferric chloride | 26 | 6 | 15 |
| Zinc chloride | | 7.2 | 20 |

It has been found that an aqueous, preferably concentrated, solution of calcium chloride is in most respects an excellent and preferred solvent for effecting the recovery of substantially anhydrous hydrogen chloride from aqueous hydrochloride acid solution on a commercial scale and by extractive distillation, and therefore specific attention will be given it in the description to follow.

The process of the invention has several distinct advantages over the process of the prior art, in that it is less complicated, is less expensive to operate, is not limited to a specific raw material and range of concentrations thereof (aqueous hydrogen chloride), and it produces a more anhydrous or purer end product (substantially anhydrous hydrogen chloride gas).

The process of the invention is preferably executed in the following manner: The auxiliary solvent, which has a greater solubility for water than hydrogen halide, is introduced into the upper portion, or presaturator section, of a fractionating column, or extractor, kept at a temperature and pressure at which the water vapor pressure of the solvent is as low as possible while still permitting free movement of the solvent. For example, a solvent which is an aqueous solution of a hygroscopic salt which has a water vapor pressure of less than about 8 mm. of mercury at the presaturator temperature will keep the water content of the vapor in the presaturator section at less than 1%, assuming the atmospheric pressure is 760 mm. If other than atmospheric pressure is employed, then the solvent should have a corresponding vapor pressure (less than 1/100th of the total operating pressure) such as to keep the water content of the end product less than 1%. As the solvent passes down through the presaturator section and through the extraction and fractionation zone to the reboiler at the bottom, it removes water from the raw material or aqueous solution of the hydrogen halide which is introduced into the extraction and fractionation zone below the presaturator section. The reboiler at the bottom of the column is kept at a temperature sufficiently high to drive substantially all the hydrogen halide gas out of the mixture of the solvent and the aqueous hydrogen halide, but not so high as to distil a substantial amount of the water from the mixture. The liquid hydrogen halide solution introduced into the extraction and fractionation zone then comes into contact with the rising heated vapors of the hydrogen halide and the descending cooler liquid solvent. The solvent absorbs the water from the raw material and the heat absorbed expels the hydrogen halide gas from the liquid. The spent or diluted salt solution is continuously withdrawn from the reboiler. If desired the spent or diluted salt solution may be regenerated by any suitable reconcentration means effective to remove the excess water and restore the solution to the desired concentration. The concentrated solution may then be cooled and returned to the absorption column and reutilized therein.

The concentration of the auxiliary solvent used depends upon the vapor pressure of the water in the salt solution at the temperature to be maintained at the top of the column, or where the end product is to be withdrawn from the mixture, and this vapor pressure will determine the amount of water which will be in the end product. Also, the amount of auxiliary solvent fed to the column depends upon the number of plates or trays in the column, the temperature at the bottom of the column, the relative amount of water in the aqueous solution of hydrogen halide fed into the column and the location of the feed plate or tray, so that the recovered hydrogen halide product has the desired low water content.

The more concentrated the hydrogen halide solution feed, the closer to the top of the column it should be inserted for efficient operation. If the hydrogen halide solution is very dilute it should be inserted near the bottom of the column to provide longer contact or scrubbing by the solvent before the hydrogen halide gas reaches the top and is withdrawn.

In the execution of our process for the dehydration of aqueous hydrogen chloride solution, we in general prefer to use a continuous system in which atmospheric pressure and temperature conditions are approximated as closely as possible, thereby eliminating the use of expensive pressure equipment. The solvent, which is preferably a 30% to 60% aqueous solution of calcium chloride, is passed down through an extraction and fractionating column of which the temperature at the top presaturator section is maintained at about 35° C. or below, while the reboiler temperature is kept below 120° C. For example, a suitable operating temperature is between 110° C. and 120° C. It has been found desirable to jacket the top of the column or presaturator zone or section and run water through the jacket to keep its temperature at 35° C. or below. Also, the calcium chloride solution may be cooled by passing it through a water cooled heat exchanger before it enters the presaturator section of the column. As the calcium chloride solution passes down the column, it becomes more dilute and is finally drawn off the bottom of the reboiler into another still maintained under conditions suitable to drive off the water and restore it to the desired concentration for reuse. However, it must be kept in mind that this concentration or regeneration of the calcium chloride solution is controlled and carried out only to the extent that the solution is not so concentrated that the calcium chloride will crystallize out when cooled to a temperature as low as 20° C.

The substantially anhydrous hydrogen chloride gas obtained as the product in general contains less than 1% water, but if this is not dry enough for the purpose for which it is to be used, it may be further dried by treating it with concentrated sulfuric acid or some other suitable dehydrating agent.

The only piece of equipment which need withstand severe corrosion over a wide range of acid concentrations is the fractionating column, which should be made of some highly acid-resistant material such as stoneware. The regenerator for spent calcium chloride solvent need not be made of such strong acid-resistant material since the percent of hydrochloric acid in the calcium chloride from the reboiler is very small. Therefore, a metal evaporator or regenerator lined with a resistant metal such as tantalum would be sufficient for this stage of the process. The regenerator design may be of any well known type of dehydrator such as a kettle, fractionating column, drying column scrubber, or the like, depending upon which is most desirable considering physical properties of the particular solvent used.

The following specific examples are cited to show results obtained by using calcium chloride solution as a solvent for recovering substantially anhydrous hydrogen chloride from aqueous hydrochloric acid solutions.

Example I

A 20% aqueous hydrochloric acid solution was fed to a suitable extraction-fractionation column. The auxiliary solvent was an aqueous 50% calcium chloride solution which was fed into the upper or presaturation zone of the column. Operating conditions were as follows:

| | |
|---|---|
| Kettle temperature °C | 120 |
| Presaturator temperature °C | 36 |
| HCl feed rate (liquid) cc./min | 1.8 |
| Salt solution feed rate cc./min | 5.4 |

A top gas consisting of 99% HCl was obtained. The bottoms were boiled to remove dissolved water and to regenerate the solvent. The water distillate in this step contained 1.7% HCl. The recovery of substantially anhydrous hydrogen chloride, based on the actual weight of top gas and the amount of acid solution fed, was about 90.5%.

Example II

Using the same apparatus as that of Example I, a 38% aqueous hydrochloric acid solution was subjected to extractive distillation, employing as the auxiliary solvent a 40% aqueous calcium chloride solution. The operating conditions were as follows:

| | |
|---|---|
| Kettle temperature °C | 115 |
| Presaturator temperature °C | 25 |
| HCl feed rate cc./min | 1.45 |
| $CaCl_2$ feed rate cc./min | 2.25 |

The top gas consisted of 99% HCl.

We claim as our invention:

1. A process for the production of substantially anhydrous hydrogen chloride which comprises introducing an aqueous 10% to 40% hydrogen chloride solution into the intermediate portion of a fractionation zone wherein it is contacted with an aqueous 30% to 60% calcium chloride solution introduced into the upper portion of the fractionation zone, applying a cooling medium to the upper portion of the fractionation zone to maintain it at a temperature of from 20° C. to 35° C., applying heat to the lower portion of the fractionation zone to maintain the temperature therein at from 110° C. to 120° C. and thereby expel dissolved hydrogen chloride from the aqueous calcium chloride solution, withdrawing the diluted aqueous calcium chloride solution substantially free of dissolved hydrogen chloride from the bottom of the fractionation zone, and withdrawing substantially anhydrous gaseous hydrogen chloride from the top of the fractionation zone.

2. A process for the production of substantially anhydrous hydrogen chloride which comprises introducing an aqueous 10% to 40% solution of hydrogen chloride into the intermediate portion of a fractionation zone wherein it is contacted with an aqueous salt solution having a 10% to 60% concentration of a salt of the group consisting of calcium chloride, magnesium chloride, calcium bromide, calcium iodide, zinc chloride and ferric chloride, which aqueous salt solution is introduced into the upper portion of the fractionation zone, applying a cooling medium to the upper portion of the fractionation zone to maintain it at a temperature of from 20° C. to 35° C., applying heat to the lower portion of the fractionation zone to maintain the temperature therein at from 110° C. to 120° C. and thereby expel dissolved hydrogen chloride from the aqueous salt solution, withdrawing the diluted aqueous salt solution substantially free of dissolved hydrogen chloride from the bottom of the fractionation zone, and withdrawing substantially anhydrous hydrogen chloride from the top of the fractionation zone.

3. A process for the production of a substantially anhydrous hydrogen halide which comprises introducing an aqueous 10% to 40% solution of a hydrogen halide into the intermediate portion of a fractionation zone wherein it is contacted with an aqueous hygroscopic salt solution having a vapor pressure not greater than 8 mm. of mercury at 20° C., said salt solution being introduced into the upper portion of the fractionation zone, applying a cooling medium to the upper portion of the fractionation zone to maintain it at a temperature of from 20° C. to 35° C., applying heat to the lower portion of the fractionation zone to maintain the temperature therein at from 110° C. to 120° C. and thereby expel the dissolved hydrogen halide from the aqueous salt solution, withdrawing the diluted aqueous salt solution substantially free of dissolved hydrogen halide from the bottom of the fractionation zone, and withdrawing the substantially anhydrous hydrogen halide from the top of the fractionation zone.

THEODORE W. EVANS.
HARRY DE V. FINCH.